US012591490B2

(12) United States Patent (10) Patent No.: US 12,591,490 B2
Cho et al. (45) Date of Patent: Mar. 31, 2026

(54) SEMICONDUCTOR DEVICE AND LINK CONFIGURING METHOD

(71) Applicant: Samsung Electronics Co., Ltd., Suwon-si (KR)

(72) Inventors: Jaeho Cho, Suwon-si (KR); Sunho Ki, Suwon-si (KR); Wangseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 18/373,072

(22) Filed: Sep. 26, 2023

(65) Prior Publication Data

US 2024/0126663 A1 Apr. 18, 2024

(30) Foreign Application Priority Data

Sep. 29, 2022 (KR) ........................ 10-2022-0124200
Jun. 8, 2023 (KR) ........................ 10-2023-0073449

(51) Int. Cl.
G06F 3/00 (2006.01)
G06F 11/14 (2006.01)
G06F 11/1471 (2026.01)
G06F 13/42 (2006.01)

(52) U.S. Cl.
CPC ...... G06F 11/1471 (2013.01); G06F 11/1407 (2013.01); G06F 13/4221 (2013.01)

(58) Field of Classification Search
CPC ............. G06F 11/1471; G06F 11/1407; G06F 13/4221; G06F 13/4295; G06F 2213/0026
See application file for complete search history.

(56) References Cited

U.S. PATENT DOCUMENTS

| | | | |
|---|---|---|---|
| 8,782,321 B2 | 7/2014 | Harriman et al. | |
| 8,793,541 B2 | 7/2014 | Hsu et al. | |
| 8,996,757 B2 | 3/2015 | Thurston et al. | |
| 9,886,402 B2 | 2/2018 | Hopgood et al. | |
| 10,747,697 B2 | 8/2020 | Kwak et al. | |
| 11,159,353 B1 | 10/2021 | Chen et al. | |
| 2018/0095920 A1* | 4/2018 | Kwak | G06F 11/2005 |
| 2019/0034376 A1* | 1/2019 | Das Sharma | G06F 12/1009 |
| 2022/0327074 A1* | 10/2022 | Jeon | G06F 1/3275 |
| 2022/0382696 A1* | 12/2022 | Jeon | G06F 13/4221 |
| 2023/0342308 A1* | 10/2023 | Shmaya | G06F 13/102 |
| 2024/0250893 A1* | 7/2024 | Gao | H04L 45/28 |

* cited by examiner

*Primary Examiner* — Henry Tsai
*Assistant Examiner* — Kim T Huynh
(74) *Attorney, Agent, or Firm* — Sughrue Mion, PLLC

(57) ABSTRACT

Provided is a semiconductor device that includes a plurality of ports and a PCIe controller. The PCIe controller includes: a link training and status state machine (LTSSM) configured to perform a link-up by configuring a plurality of lanes on the plurality of ports, and a memory storing a first preset as a reference value, the first preset being configured based on a successful link-up performed by the LTSSM. The PCIe controller is configured to perform a verification of a second preset that is configured by the LTSSM based on the reference value, to determine whether the second preset is valid.

16 Claims, 19 Drawing Sheets

FIG. 9

| MEMORY | |
|---|---|
| Detect(S0) | Polling (S1) |
| Configuration (S2) | L0 (S3) |
| Recovery (S4) | L0 (S5) |

FIG. 14

|  | POLICY1 | POLICY2 |
|---|---|---|
| PRECISION | RELATIVELY LOW | RELATIVELY HIGH |
| SIZE | SIZE1 (SAME) | |
| ERROR RANGE | RANGE1 | RANGE2 |

FIG. 15

|  | POLICY1 | POLICY2 |
|---|---|---|
| PRECISION | RELATIVELY LOW | RELATIVELY HIGH |
| PERFORMANCE SPEED | RELATIVELY HIGH | RELATIVELY LOW |
| SIZE | SIZE2 | SIZE3 |
| ERROR RANGE | RANGE3 (SAME) | |

FIG. 16

|  | POLICY1 | POLICY2 | POLICY3 |
|---|---|---|---|
| PRECISION | RELATIVELY LOW | MID | RELATIVELY HIGH |
| PERFORMANCE SPEED | RELATIVELY HIGH | MID | RELATIVELY LOW |
| SIZE | SIZE4 | SIZE5 | SIZE6 |
| ERROR RANGE | RANGE4 | RANGE5 | RANGE6 |

FIG. 17

| | POLICY1 | POLICY2 | POLICY3 |
|---|---|---|---|
| PRECISION | RELATIVELY LOW | MID | RELATIVELY HIGH |
| PERFORMANCE SPEED | RELATIVELY HIGH | MID | RELATIVELY LOW |
| SIZE | SIZE7 | SIZE8 | SIZE9 |
| ERROR RANGE | RANGE7 | RANGE8 | RANGE9 |
| DIFFERENCE | DIFF1 | DIFF2 | DIFF3 |

SEMICONDUCTOR DEVICE AND LINK CONFIGURING METHOD

CROSS-REFERENCE TO RELATED APPLICATIONS

This application claims priority to Korean Patent Application No. 10-2022-0124200, filed on Sep. 29, 2022, and Korean Patent Application No. 10-2023-0073449, filed on Jun. 8, 2023, in the Korean Intellectual Property Office, the disclosures of which are incorporated by reference herein in their entireties.

BACKGROUND

1. Field

The disclosure relates to a semiconductor device and a link configuring method thereof.

2. Description of Related Art

A semiconductor device includes an interface for exchanging data with other external devices (e.g., another semiconductor device), and the interface may be implemented according to various standards. Among the interfaces connecting the semiconductor devices to each other, a PCI Express (PCIe) interface is applied to various fields for high-speed data transmission. The PCIe interface is a serial transmission type interface, defined by a PCIe specification, and provides bidirectional connections that may transmit and receive a data simultaneously. In order for the semiconductor devices to exchange the data with each other through the PCIe interface, a process of setting a link in a physical layer (PHY) of the PCIe interface, and a process of selecting values of PHY parameters that may be configured in the physical layer, etc. may need to be executed.

SUMMARY

Example embodiments provide a semiconductor device and a link configuring method that may improve a precision and a stability of a link by verifying a preset configured in a link-up process.

According to an aspect of an embodiment, a semiconductor device includes: a plurality of ports configured to send and receive data on a PCI express (PCIe) interface; and a PCIe controller operatively connected to the plurality of ports. The PCIe controller includes: a link training and status state machine (LTSSM) configured to perform a link-up by configuring a plurality of lanes on the plurality of ports, a memory storing a first preset as a reference value, the first preset being configured based on a successful link-up performed by the LTSSM, where the PCIe controller is configured to perform a verification of a second preset that is configured by the LTSSM based on the reference value, to determine whether the second preset is valid.

According to an aspect of an embodiment, a semiconductor device includes: a plurality of ports configured to send and receive data on a PCI express (PCIe) interface; and a PCIe controller operatively connected to the plurality of ports, where the PCIe controller is configured to: perform a link-up process to configure a plurality of lanes in on the plurality of ports, perform a verification of a first preset that is configured at a first time based on a first recovery policy, and perform a verification of a second preset that is configured at a second time, after the first time, based on a second recovery policy.

According to an aspect of an embodiment, a method of configuring a link, includes: obtaining a plurality of presets, the plurality of presets being configured in a recovery operation of a link training and status state machine (LT-SSM); determining whether the plurality of presets are valid based on a recovery policy; and adjusting a physical layer (PHY) parameter based on determining that at least one preset from among the plurality of presets is invalid.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9, 10, and 11 illustrate an operation of a semiconductor device according to an embodiment;

FIGS. 14, 15, 16, and 17 illustrate a recovery policy according to an embodiment;

DETAILED DESCRIPTION

Figure 1:
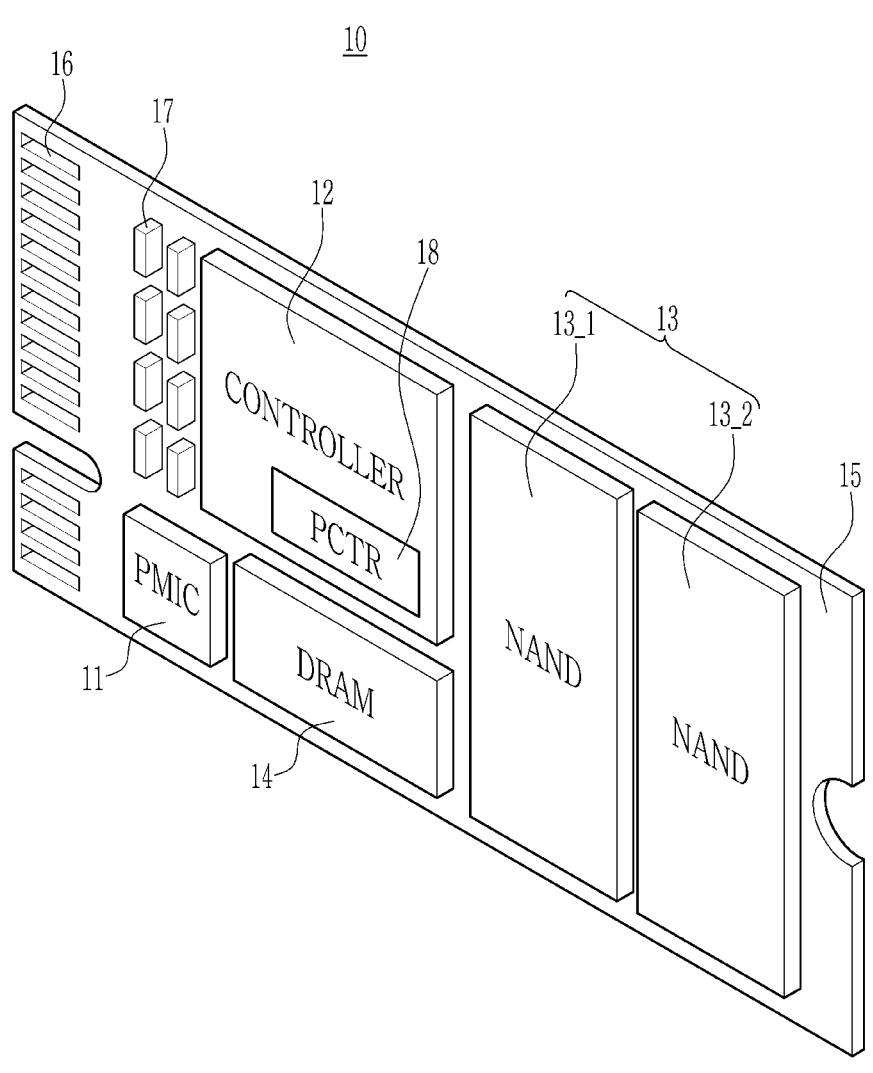
FIG. 1 illustrates a storage device including a semiconductor device according to an embodiment.

In the following detailed description, certain example embodiments of the present disclosure are described with reference to the drawings. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

FIG. 1 illustrates a storage device including a semiconductor device according to an embodiment.

The storage device 10 may have a form factor according to an M.2 standard, and may communicate with an external host, such as a central processing device, a system-on-chip, an application processor, etc., according to a Peripheral Component Interconnect express (PCIe) interface protocol. The PCIe interface protocol is a serial transmission type interface established by the PCI SIG, and provides a bidirectional connection that can transmit and receive a data simultaneously. The bidirectional connection includes a simplex transmit path and a simplex receive path, and to emphasize this structure, the bidirectional connection model adopted by the PCIe interface protocol is referred to as a dual-simplex connection model.

The storage device 10 may transmit and receive a data by using the PCIe interface protocol. At this time, a transmission path and a reception path through which data moves are defined as a link, and the link may include one or more pairs of the transmission path and the reception path. In addition, a pair of transmission paths and reception paths are defined as a lane, and the number of lanes constituting one link may be defined as a link width. The storage device 10 may establish a link in a physical layer of the PCIe interface protocol for sending and receiving data.

The storage device 10 may include a power supply circuit 11, a controller 12, memory devices 13, a dynamic random-access memory (DRAM) 14, and a system substrate 15. The power supply circuit 11, and the controller 12 and the memory devices 13 may be electrically connected to each other by wire patterns formed on the system substrate 15. At least one integrated circuits 17 may be further mounted on the system substrate 15.

The system substrate 15 may include a connector 16 including a plurality of ports coupled to an external host. A plurality of ports included in the connector 16 may be connected to the power supply circuit 11 and the controller 12. For example, the power supply circuit 11 may be connected to power pins among a plurality of ports to receive a power from an external device, and may generate internal power source voltages necessary for the operations of the controller 12, the memory devices 13, and the DRAM 14, etc. The power supply circuit 11 includes a Power Management Integrated Circuit (PMIC), and may include a distribution circuit that supplies the internal power source voltages output from the PMIC to the controller 12, the memory devices 13, and the DRAM 14, etc. according to embodiments.

The controller 12 may write data to the memory devices 13 or read data from the memory devices 13, and may send and receive data with an external device, for example, a host. The memory devices 13 may include first memory device 13_1 and second memory device 13_2 separated from each other, and each of the first memory device 13_1 and the second memory device 13_2 may include one or more memory chips. According to an embodiment, the number of the y memory devices constituting the memory devices 13 may be different. The memory chips may be NAND memory chips, and the controller 12 may include a NAND controller and memory interface for controlling the NAND memory chips.

The DRAM 14 may operate as a buffer memory to mitigate the speed difference between the memory devices 13, which are data storage spaces, and the host, which is an external device. The DRAM 14 included in the storage device 10 may also operate as a kind of cache memory, and may provide a space for temporarily storing data in a control operation for the memory devices 13. The controller 12 may further include a DRAM controller for controlling the DRAM 14.

The controller 12 may include a PCIe controller (PCTR) 18 that establishes a link between an external host and a PCIe interface. The PCIe controller 18 may set data lanes for actually sending and receiving data, clock lanes for receiving a clock signal, and power lanes for receiving a power source voltage for a plurality of ports included in the connector 16.

In addition, the PCIe controller 18 may proceed with a link-up process of establishing a link between an external host and the storage device 10 by determining values of PHY parameters that may be configured in the physical layer. For example, the PCIe controller 18 includes a Link Training and Status State Machine (LTSSM) that expresses various states of the link, and according to the LTSSM, a link width, a data rate, a lane number, a lane polarity, a boundary between consecutive bits, etc. may be determined.

In an embodiment, the order in which the LTSSM that is successful in the link-up executes the states may be stored in the memory inside the PCIe controller 18 as a reference order. When a calibration operation for adjusting the PHY parameters is executed, the PCIe controller 18 may change at least one of the PHY parameters and then compare the order of the states executed by the LTSSM to the reference order to complete the link-up. The PCIe controller 18 may adjust the PHY parameters until the order of the states executed by the LTSSM to complete the link-up matches the reference order. Therefore, the PHY parameters may be adjusted so that data may be transmitted and received under optimal conditions.

In an embodiment, the LTSSM may perform a recovery state of the states during the link-up process. For example, the LTSSM may enter a recovery state when an error occurs in a configuration state, a L0 state, or a L0s state, or in a case that it returns to the L0 state from the L1 state. The preset value and the preset history configured in the recovery state by the LTSSM that is successfully linked-up may be stored in the internal memory of the PCIe controller 18 as a reference value and a reference history, respectively. The PCIe controller 18 may compare the preset value and the preset history configured in the recovery state with the reference value and the reference history. The PCIe controller 18 may perform a comparison if the order of the states executed by the LTSSM matches the reference order. The PCIe controller 18 may perform the comparison based on the recovery policy. The recovery policy may include a policy for at least one of precision, a history size, a permissible error range, a degree of difference, and an execution speed. The PCIe controller 18 may adjust the PHY parameters until the preset value and the preset history configured by the LTSSM to complete the recovery state match the reference value and the reference history. Therefore, the PHY parameters may be adjusted so that data may be transmitted and received under optimal conditions.

Figure 2:
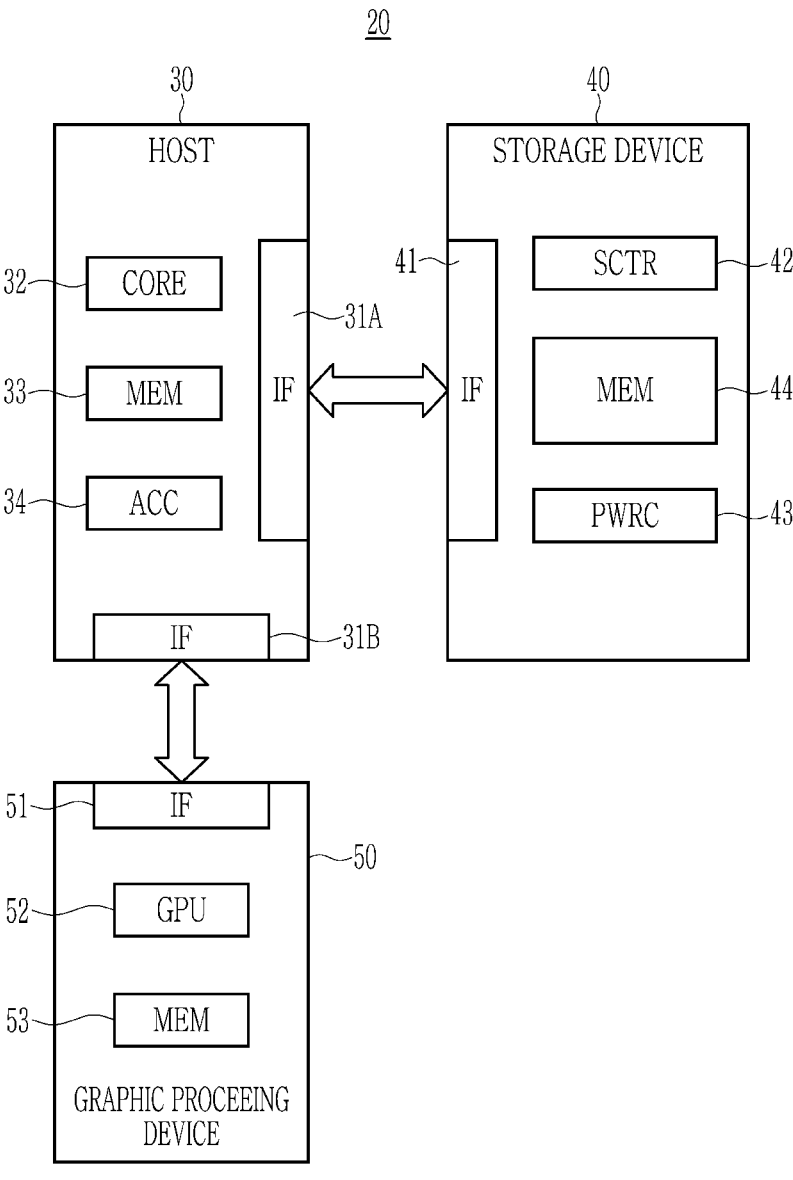
FIG. 2 illustrates a system including a semiconductor device according to an embodiment.

FIG. 2 illustrates a system including a semiconductor device according to an embodiment.

Referring to FIG. 2, a system 20 may include a host 30 and a storage device 40, and a graphic processing device 50. The host 30 may control the storage device 40 to store data in the storage device 40 or read data stored in the storage device 40. In addition, the host 30 may send and receive a graphic data to the graphic processing device 50. The host 30 may be one of devices such as a central processing device (CPU), an application processor AP, and a system-on-chip (SoC). According to an embodiment, the host 30 may be further connected with other devices using PCIe interface.

The host 30 includes a first interface (IF) 31A connected to the storage device 40, a second interface (IF) 31B connected to the graphic processing device 50, a core 32 that executes calculations, and a memory (MEM); 33, and an accelerator (ACC) 34. According to an embodiment, the host 30 may include two or more of the core 32, and the memory 33 may be a cache memory inside the host 30. The accelerator 34 may execute an AI data calculation and the like.

The storage device 40 may include an interface (IF) 41, an SSD controller (SCTR); 42, a power supply circuit (PWRC) 43, and a memory (MEM) 44. It operates by receiving control commands from the host 30 through the interface 41, receives data and stores them in the memory 44, or draws out data stored in memory 44 and outputs data to the host 30. The control command may include an address information, and the controller 42 may refer to the address information to store data in at least one of the plurality of memory chips included in the memory 44 or to read data from at least one of the plurality of memory chips.

The graphic processing device 50 may include an interface (IF) 51, a GPU 52, a memory (MEM) 53. The GPU 52 processes a graphic data received from the host 30, and the memory 53 may store the graphic data processed by the GPU 52. As an example, the memory 53 may include a DRAM, a parallel random-access memory (PRAM), a resistive random-access memory (RRAM), a magnetoresistive random-access memory (MRAM), etc. having a high read/write speed.

In an embodiment, the first interface 31A of the host 30 and the interface 41 of the storage device 40, and the second interface 31B of the host 30 and the interface 51 of the graphic processing device 50 may send and receive data with each other through a PCIe interface. In order to exchange data with each other, when the power of the system 20 is turned on and the power is supplied to the host 30, the storage device 40, and the graphic processing device 50, the link-up process configuring the links between the interfaces 31A, 31B, 41, and 51 may be executed. In the link-up process, a data rate, a voltage level and a slew rate of a signal transmitting data, the number and polarity of the data lanes, and a lane number may be determined.

In general, the link-up process may be executed based on PHY parameters having predetermined values. However, at least one value among the PHY parameters to implement an optimal environment for sending and receiving data may be different depending on the type of the devices using the PCIe interface, the external temperature, and the size of the power supplied to system 20. In general, the value of each PHY parameter is fixed before a device using the PCIe interface is shipped. Therefore, when a device connected to the PCIe interface is changed or the external temperature and the power are changed, the performance of the system 20 may deteriorate.

In an embodiment, a Built-In Self Calibration (BISC) function that executes a calibration operation for changing the PHY parameters by itself in PCIe controller may be mounted on at least one of the devices 30-50. Therefore, when the device connected to the PCIe interface is changed or the external temperature and the power are changed, by changing the PHY parameters as needed and performing the link-up process again, the PCIe interface may be controlled in an optimal condition and the performance of the system 20 may be improved.

For example, the calibration operation and the link-up process that follows it may be executed by itself in at least one PCIe controller among the host 30, the storage device 40, and the graphic processing device 50. Each of the core 32, the SSD controller 42, and the GPU 52 may include a PCIe controller. In an embodiment, the first time point at which the PCIe controller included in the storage device 40 executes the calibration operation to change at least one of the PHY parameters may be different from the second point in time when the PCIe controller of the graphic processing device 50 executes the calibration operation. Depending on the type of the semiconductor device, the condition for executing the calibration operation, the time interval for executing the calibration operation, and the like may be different.

Also, the PHY parameters changed by the PCIe controller of the storage device 40 at the first time may be different from the PHY parameters changed by the PCIe controller of the graphic processing device 50 at the second time. This is because the operating environments of the storage device 40 and the graphic processing device 50 may be different depending on the configuration of the system 20, the usage amount of each of the storage device 40 and graphic processing device 50, and the like. For example, if more graphic processing device 50 are used after the system 20 is turned on, the internal temperature of the storage device 40 may be lower than the internal temperature of the graphic processing device 50. Accordingly, the PHY parameters adjusted in the calibration operation for optimizing the PCIe interface may appear differently in the storage device 40 and the graphic processing device 50.

Each of the storage device 40 and the graphic processing device 50 may store the reference sequence in a memory inside the PCIe controller. As described above, the reference order may include the order of the states executed in the LTSSM until the PCIe controller succeeds in the link configuration by using the LTSSM, For example, the reference order of the storage device 40 may be different from the reference order of the graphic processing device 50.

When at least one of the PHY parameters is adjusted, for each of the storage device 40 and the graphic processing device 50, the PCIe controller may reconfigure the link by using the LTSSM. The PCIe controller may compare the order of the states moved through with the reference order until the LTSSM reconfigures the link. If the result of the comparison with the reference order is inconsistent, the PCIe controller may repeatedly adjust the PHY parameters until it is determined that the comparison result with the reference order matches. Since the reference order may be different in the storage device 40 and the graphic processing device 50, the time required to execute the calibration operation in the storage device 40 and reconstruct the link of the PCIe interface may be different from the time required to execute the calibration operation in the graphic processing device 50 and reconstruct the link of the PCIe interface.

If the comparison result with the reference sequence matches, the PCIe controller may determine whether the preset configured in the recovery state is valid among the states executed in the LTSSM. For example, the PCIe specification defines a plurality of preset values used in a transmission equalizer, and each preset value has different coefficient values, voltage ratio values, the like to implement a pre-shoot and a de-emphasis. The operation in which the LTSSM configures the preset in the recovery state may include an operation for configuring the coefficient for the precursor used in a transmission equalizer, the coefficient for a current cursor, and the coefficient for a post-cursor.

The PCIe controller may verify a validity of the preset configured in the recovery state based on the reference value and a preset history. For example, the PCIe controller may determine that the configured preset is valid if it matches the reference value and the preset history. The PCIe controller may determine that the configured preset is invalid if it does not match the reference value and the preset history. According to an embodiment, if the configured preset partially matches the reference value and the preset history, it may be determined to be valid based on the recovery policy. The PCIe controller may change the PHY parameters if the configured preset is invalid. The PCIe controller may end the calibration operation if the configured preset is valid.

Figure 3:
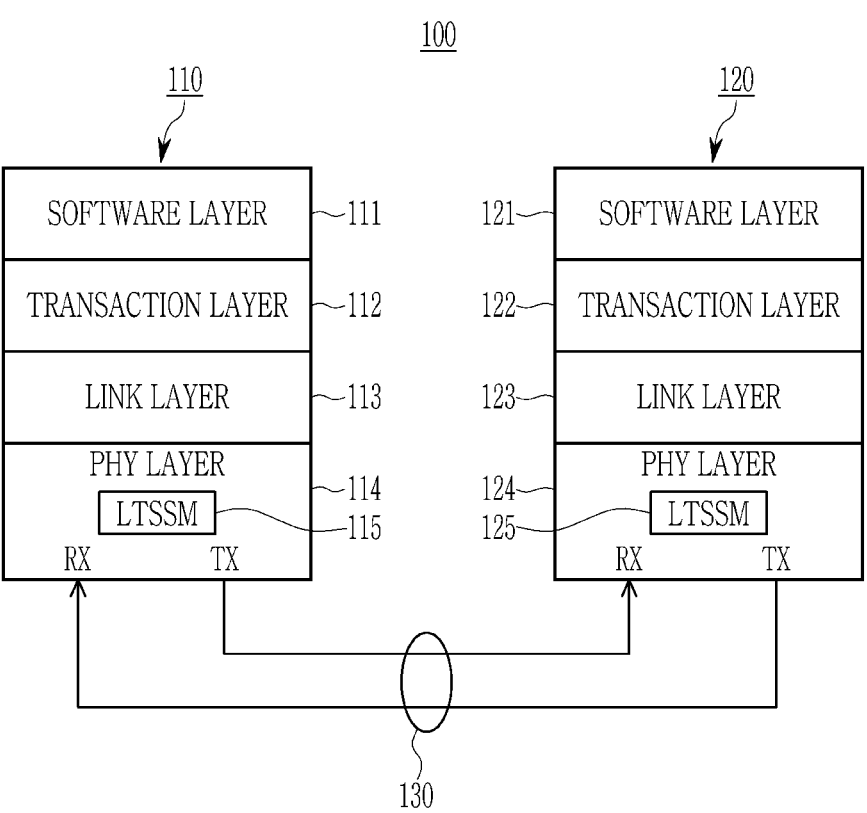
FIG. 3 illustrates an operation of a system including a semiconductor device according to an embodiment.

FIG. 3 illustrates an operation of a system including a semiconductor device according to an embodiment.

Referring to FIG. 3, the system 100 may include a first semiconductor device 110 and a second semiconductor device 120. The first semiconductor device 110 and the second semiconductor device 120 may send and receive data according to a PCIe interface.

As shown in FIG. 3, a PCIe architecture may include a plurality of layers that are logically separated. For example, the PCIe architecture may include software layers 111 and 121, transaction layers 112 and 122, link layers 113 and 123, and physical layers 114 and 124.

Among the layers included in the PCIe architecture, the physical layers 114 and 124 may correspond to the lowest layers, and packets generated by the link layers 113 and 123 may be serially transmitted between the first and second semiconductor devices 110 and 120. Referring to FIG. 3, the physical layers 114 and 124 provide a link 130 formed through a transmitter TX and a receiver RX of the first and second semiconductor devices 110 and 120, and the packets may be transmitted between the first and second semiconductor devices 110 and 120 through the link 130

The link layers 113 and 123 may correspond to higher layers than the physical layers 114 and 124, and may provide functions for guaranteeing a reliability of the packet transmission through the link 130 and managing the link 130. For example, the link layers 113 and 123 may add a sequence number information, a link cyclic redundancy check (LCRC) information, and the like to the packets generated in the transaction layers 112 and 122.

The transaction layers 112 and 122 may correspond to higher layers than the link layers 113 and 123. The transaction layers 112 and 122 may receive a read or write request from the software layers 111 and 121, generate a request packet to be transmitted to the link layers 113 and 123. In addition, the transaction layers 112 and 122 may receive a response packet from the link layers 113 and 123 and match the request received from the software layer 111 and 121. The transaction layers 112 and 122 may transmit the packets including a header information and an end-to-end cyclic redundancy check (ECRC) information to the link layers 113 and 123.

The software layers 111 and 121 may correspond to the highest layers. In an embodiment, the software layers 111 and 121 are not defined by the PCIe specification. For example, the software layers 111 and 121 may include a software that drives each of the semiconductor devices 110 and 120 including the PCIe interface, or a software that receives a data read or write request from a user or a host application and provides a response to the request to the user or host application.

More detailed information on the physical layers 114 and 124, the link layers 113 and 123, and the transaction layers 112 and 122 may be understood by referring to the PCIe specification.

Referring to FIG. 3, the physical layer 114 of the first semiconductor device 110 may include a Link Training and Status State Machine (LTSSM) 115. Similarly, the physical layer 124 of the second semiconductor device 120 may also include a LTSSM 125. For example, the LTSSM 115, and 125 may be stored in each PCIe controller of the semiconductor devices 110 and 120, but is not necessarily limited to this form.

Taking the first semiconductor device 110 as an example, the LTSSM 115 includes a detect state, a polling state, a configured state, a recovery state, a L0 state, a L0s state, a L1 state, a L2 state, a hot reset state, a loopback state, and a disable state. The LTSSM 115 may transition 11 states and perform various processes to transmit data according to the PCIe interface. The definition for each of the eleven states included in the LTSSM 115 is also described in the PCIe specification, and the LTSSM 115 may be implemented to follow the LTSSM-related definition described in the PCIe specification. Similarly, the description of LTSSM 115 may be equally applied to LTSSM 125.

In an embodiment, at least one of the LTSSM 115 of the first semiconductor device 110 and the LTSSM 125 of the second semiconductor device 120 may performs a link-up process for configuring the link 130 for the first and second semiconductor devices 110 and 120 to send and receive data with each other. As mentioned above, the paths through which data is transmitted between the first and second semiconductor devices 110 and 120 may be defined as the link 130. The link 130 includes one or more pairs of the transmission path and the reception path, where one pair of the transmission path and the reception path may be defined as "a lane". Also, the number of the lanes constituting one link 130 may be defined as "a link width".

At least one of the LTSSM 115 of the first semiconductor device 110 and the LTSSM 125 of the second semiconductor device 120, to configure the link 130 between the first and second semiconductor devices 110 and 120, may perform a link number negotiation and a lane number negotiation, determine whether the lanes operate normally, configure the link 130 by selecting the lanes to be used for the data transmission, and determine the link width.

When the link-up is completed, the first and second semiconductor devices 110 and 120 may send and receive data with each other. As described above, the data packet transmitted and received between the physical layers 114 and 124 may further include a header information, an ECRC information, a sequence number information, a LCRC information, and the like, in addition to the data to be actually transmitted.

The perform the link-up through the LTSSMs 115 and 125, the PHY parameters may be adjusted in each of the physical layers 114 and 124. The PHY parameters may be parameters that affect at least one of the level, the slew rate, and the frequency of the signal output by the transmitter TX or received by the receiver RX.

The PHY parameters may be defined in the PCIe specification, and in general, the PHY parameters may be configured in advance before the devices supporting the PCIe interface, such as the first and second semiconductor devices 110 and 120, are shipped. However, by the type of the device connected to the PCIe interface or the operation environment of the device, for example, the temperature, the like, the PHY parameters needed to control the PCIe interface for the optimal performance may vary. If the PHY parameters are configured in advance, it may be difficult to respond to various conditions as described above.

In an embodiment, the calibration function capable of changing the PHY parameters may be mounted on the device supporting the PCIe interface. For example, the PCIe controller may execute the calibration function to change at least one of the PHY parameters, and again execute the link-up process for configuring the link 130 by using the changed PHY parameters.

In an embodiment, the PCIe controller, in the course of re-executing the link-up process, may refer to the reference order previously stored in the memory or the like. The reference order may sequentially include the states executed by the LTSSMs 115 and 125 until the link is normally configured and the link-up is terminated. Even if the link-up is terminated, until the link-up is terminated If the order of the states executed by the LTSSMs 115 and 125 is different from the reference order, the PCIe controller may adjust at least one of the PHY parameters and execute the link-up again by using the LTSSMs 115 and 125.

For example, the PCIe controller may select and refer to one of the plurality of reference orders. In the memory included in the semiconductor device along with the PCIe controller, a plurality of reference orders classified according to at least one of peripheral environmental factors such as the type of the external device connected through the PCIe interface, the external temperature, and the size of the power source may be stored. The PCIe controller may select an optimal reference order among a plurality of reference orders in consideration of surrounding environmental factors in the operation time of the calibration for adjusting PHY parameters, and may perform the link-up with reference to the selected reference order.

If the order of the states executed by the LTSSMs 115 and 125 matches the reference order, the PCIe controller may determine whether the preset configured by the LTSSM 115 and 125 in the recovery state is valid. The PCIe controller may compare the configured preset with the reference value and the preset history. The PCIe controller may perform the comparison based on the recovery policy. The PCIe controller may adjust at least one of the PHY parameters if the configured preset is invalid, and terminate the calibration function if the configured preset is valid.

As described above, as the PHY parameters are changed, the voltage level, the slew rate, the frequency, and the like of the signal transmitted through the link 130 may be changed. Therefore, in an embodiment, even when the device including the PCIe interface is shipped and the actual user is using the device, the PHY parameters may be adjusted with the configuration optimized for various operation environments, the PCIe interface with the optimal performance may be controlled.

Figure 4:
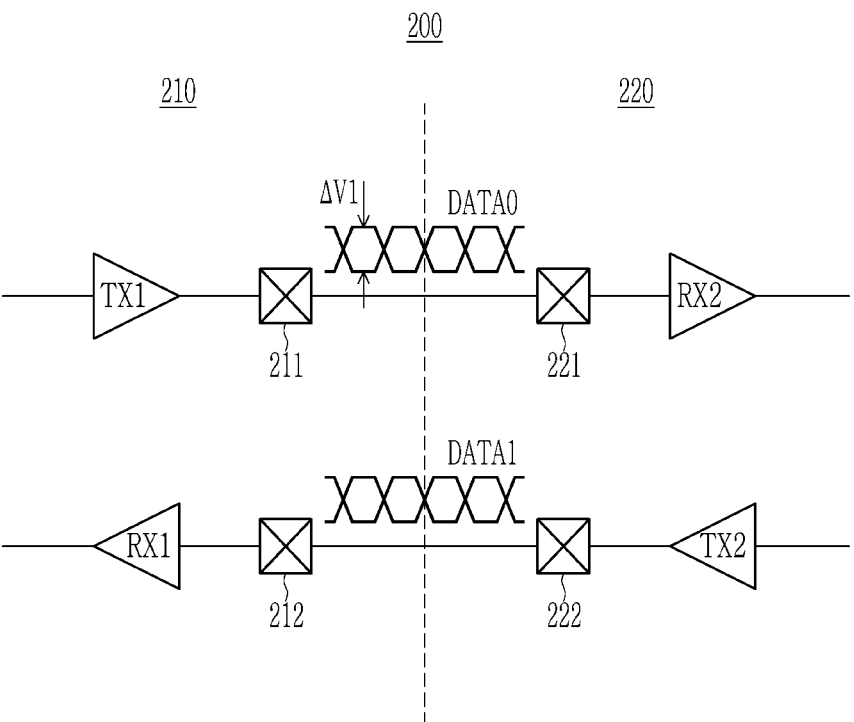
FIG. 4 and FIG. 5 illustrate an operation of a system including a semiconductor device according to an embodiment.
Figure 5:
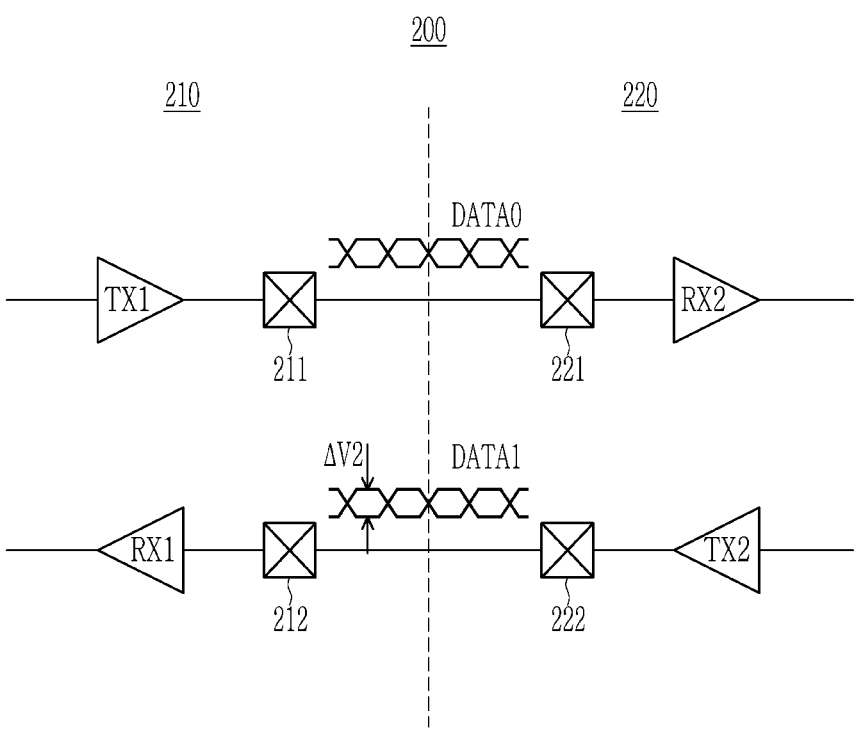

FIG. 4 and FIG. 5 illustrate an operation of a system including a semiconductor device according to an embodiment.

Referring to FIG. 4 and FIG. 5, the system 200 may include a first semiconductor device 210 and a second semiconductor device 220. The first semiconductor device 210 may include a first transmitter TX1 and a first receiver RX1, and the second semiconductor device 220 may include a second transmitter TX2 and a second receiver RX2.

A first data signal DATA0 may be transmitted in a first transmission path between a first transmission port 211 connected to the first transmitter TX1 and a second reception port 221 connected to the second receiver RX2. Meanwhile, a second data signal DATA1 may be transmitted in a second transmission path between a second transmission port 222 connected to the second transmitter TX2 and a first reception port 211 connected to the first receiver RX1. The first transmission path and the second transmission path are included in one lane, and as shown in FIG. 4 and FIG. 5, a path for transmitting a pair of differential signals may be provided.

The first and second data signals DATA0 and DATA1 may respectively have a waveform as shown in FIG. 4 and FIG. 5. For example, amplitudes $\Delta V1$ and $\Delta V2$ determined by a maximum voltage level and a minimum voltage level of the first and second data signals DATA0 and DATA1, and the slew rate representing the voltage increase/decrease speed of the first and second data signals DATA0 and DATA1, etc. may be different from each other in the embodiment shown in FIG. 4 and the embodiment shown in FIG. 5.

This may be because the PHY parameters configured when at least one LTSSM of the first and second semiconductor devices 210 and 220 completes the link-up process are different from each other in the embodiment shown in FIG. 4 and the embodiment shown in FIG. 5. At least one of the first and second semiconductor devices 210, and 220, when a BISC request from the user is received, a predetermined time elapses, or a power is cut off, and a new power supply is received, may change at least one of the PHY parameters and perform the link-up process again.

Therefore, even when there is no change in the first and second semiconductor devices 210 and 220 constituting the system 200, at least one of the PHY parameters may have a different value at different times. In addition, as at least one of the PHY parameters is configured with a different value, at least one of the data signals DATA0 and DATA1 transmitted through the same lane have different waveforms as shown in FIG. 4 and FIG. 5.

The first semiconductor device 210 may verify a preset configured for the first transmitter TX1 in the link-up process. The first semiconductor device 210 may perform the verification based on at least one of the recovery policy, the reference value, and the preset history. If the verification fails, the first semiconductor device 210 may change at least one of the PHY parameters and execute the link-up process again, and if the verification succeeds, the link-up process may be terminated. Similarly, the second semiconductor device 220 may verify the preset configured for the second transmitter TX2 in the link-up process.

Figure 6:
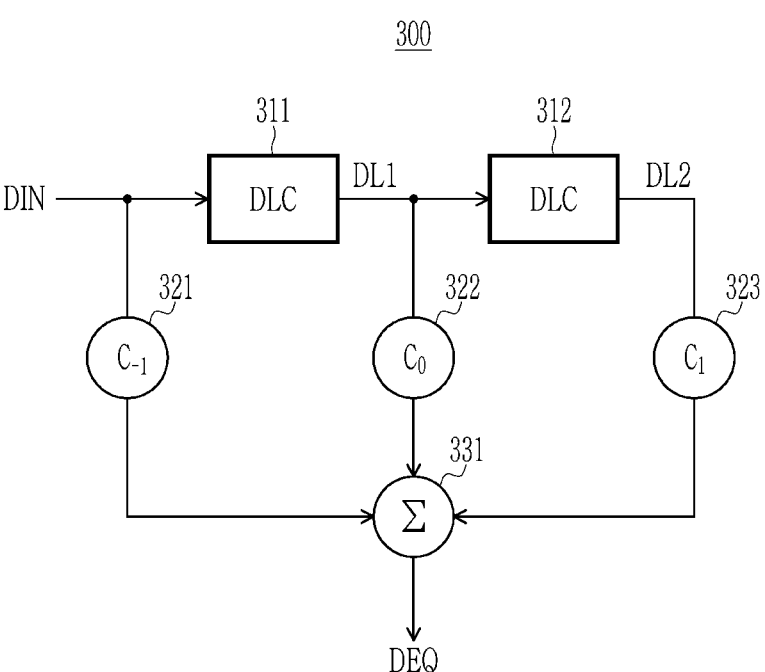
FIG. 6 illustrates an operation of a transmission equalizer according to an embodiment.

FIG. 6 illustrates an operation of a transmission equalizer according to an embodiment.

Referring to FIG. 6, the transmission equalizer may include a Finite Impulse Response (FIR) filter 300. The FIR filter 300 may be a 3-tap FIR filter for mitigating or removing Inter Symbol Interference (ISI) for a precursor, a current cursor, and a post cursor.

The FIR filter 300 may perform the equalization on a signal DIN to output a signal DEQ in which the ISI is alleviated or removed. The equalization operation of the FIR filter 300 may be understood as a pre-distortion that compensates for a channel loss. For example, the FIR filter 300 may perform at least one of a pre-shoot and a de-emphasis on the signal DIN. The pre-shoot may mean an operation that emphasizes the last bit in a bit string, and the deemphasis may mean an operation that emphasizes the first bit in a bit string. The receiver may transmit a feedback signal to the transmitter in response to the signal DEQ. The transmitter may configure the preset based on the feedback signal. The preset may include a coefficient for the precursor, a coefficient for the current cursor, and a coefficient for the postcursor that affect the equalization. The FIR filter 300 may perform the equalization on the signal DIN based on the configured coefficient.

The FIR filter 300 may include delay circuits (DLC) 311 and 312, signal processing circuits 321, 322, and 323, and a summer 331. The delay circuits 311 and 312 may delay the input signal by 1 unit interval (UI). 1 UI may correspond to the interval between the cursors. That is, the interval between the current cursor and the predecessor may be 1 UI, and the interval between the current cursor and the postcursor may be 1 UI. The delay circuit 311 may output a signal DL1 by delaying the signal DIN, and the delay circuit 312 may output a signal DL2 by delaying the signal DL1.

The signal processing circuits 321, 322, and 323 may process an input signal based on coefficients $c-1$, $c0$, and $c1$. For example, the signal processing circuits 321-323 are multipliers and multiply the input signals by coefficients $c-1$, $c0$, and $c1$. The coefficients $c-1$, $c0$, and $c1$ may be determined based on the preset configured in the recovery state during the link-up process. The preset and the coefficients $c-1$, $c0$, $c1$ corresponding to the preset are defined in the PCIe specification. The coefficient $c-1$ may be the coefficient of the precursor, the coefficient $c0$ may be the coefficient of the current cursor, and the coefficient $c1$ may be the coefficient of the post cursor. The sum of the coefficients $c-1$, $c0$, and $c1$ may be equal. For example, the sum of the coefficients $c-1$, $c0$, and $c1$ may be 1. The PCIe specification defines the values of the presets and the coefficients $c-1$ and $c1$ corresponding to the presets, and the value of the coefficient $c0$ may be determined based on the values of the coefficients $c-1$ and $c1$. The signal processing circuits 321, 322, and 323 may output signals processed based on the coefficients $c-1$, $c0$, and $c1$ to the adder 331.

The adder 331 may output the signal DEQ by summing the output signals of the signal processing circuits 321, 322, and 323. The signal DEQ may be a signal for which at least one of the pre-shoot and the deemphasis has been performed on the signal DIN. The receiver may transmit the feedback signal to the transmitter in response to the signal DEQ. The transmitter may perform the link-up process based on the feedback signal. Similarly, the semiconductor device including the receiver may further include a transmitter equally performing the operation of FIG. 6.

Figure 7:
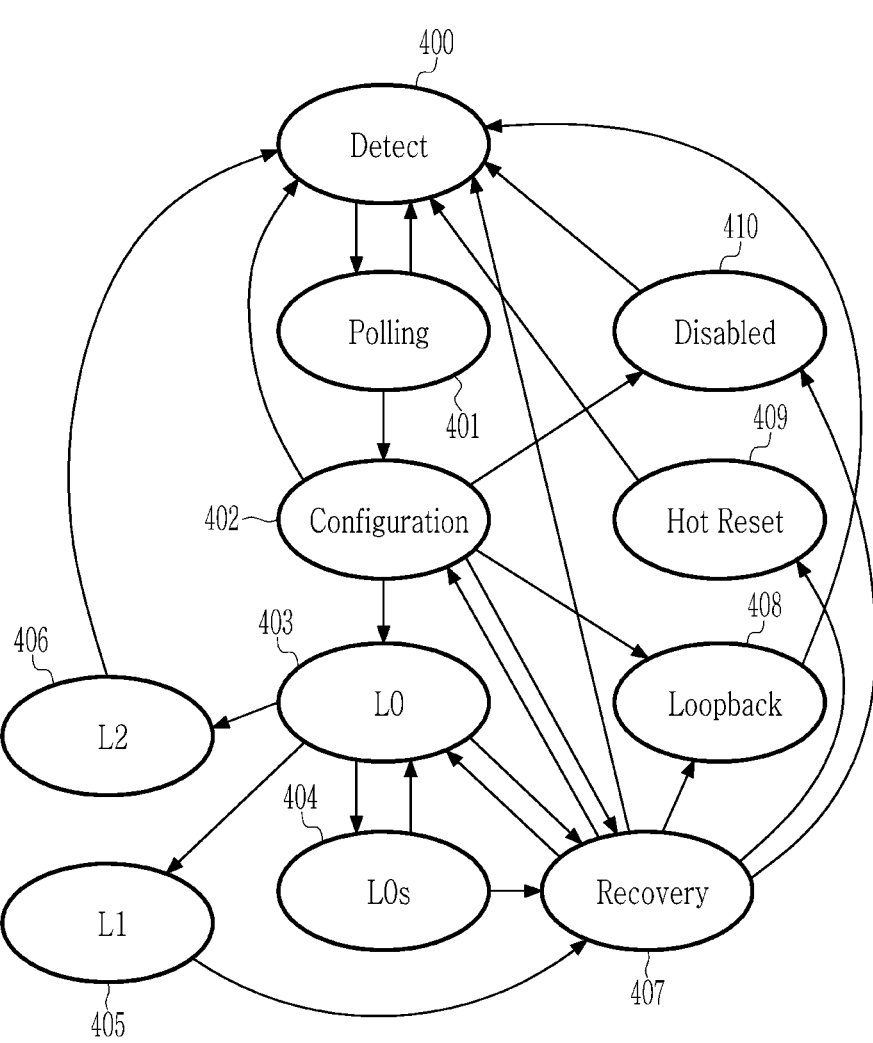
FIG. 7 illustrates a link training and status state machine (LTSSM) included in a semiconductor device according to an embodiment.

FIG. 7 illustrates a link training and status state machine (LTSSM) included in a semiconductor device according to an embodiment.

As described above, the LTSSM may provide a link-up process, which is a control process for configuring and initializing a link. In addition to the link configuration and the initialization in the PCIe interface, the LTSSM may perform functions such as a supporting of the packet transmission, a link error recovery, and a restarting the PCIe interface in a low power state.

For example, the LTSSM may move eleven states 400, 401, 402 . . . 410 and perform the mentioned function. The LTSSM may enter a detect state 400 in which the circuit of the physical layer is initialized or an existence of another external device connected to the PCIe interface is detected in response to an instruction received from the link layer. In the detect state 400, the LTSSM may detect a receiver connected to the transmitter and move to a polling state 401 of configuring a bit lock, a symbol lock, and a lane polarity. For example, when the LTSSM transitions from the detect state 400 to the polling state 401, the lane where the receiver is not detected may enter an electrical idle state.

When the LTSSM moves to a configuration state 402, a data rate, a lane number, a link width, etc. may be configured. When the operation in the configuration state 402 is completed, the LTSSM may enter a L0 state 403, which is a normal operation state for sending and receiving the data through the configured link. The LTSSM may move to a L0s state 404, which is an electrical idle/standby state, a L1 state 405, which is a low power standby/sleep state, or a L2 state 406, which is an off state, according to the operation status of the PCIe interface.

Also, if an error occurs during the operation in the L0 state 403, the LTSSM may enter a recovery state 407. Also, in order to return from the L1 state 405 to the L0 state 403, the LTSSM may move to the recovery state 407. In the recovery state 407, the LTSSM may execute functions such as the bit lock, the symbol lock, the skew removal between the lanes, or change a link speed based on the data such as a training sequence that is sent and received between the transmitter and the receiver. For example, in the recovery state 407, the LTSSM has a sub-state such as Recovery. RcvrLock, Recovery. Equalization, Recovery. Speed, Recovery. RcvrCfg, Recovery.Idle, the like, depending on the result in the sub-state, may enter the detect state 400, the configuration state 402, the L0 state 403, the loopback state 408, a hot reset state 409, or a disabled state 410. The sub-state of the recovery state 407 is described with reference to FIG. 8. The LTSSM may optimize the equalization by exchanging the training sequence with the receiver in the sub-state of Recovery.Equalization. The LTSSM may configure the preset and complete the equalization while sequentially changing the phase from a phase0 to a phase3 in Recovery.Equalization. Each phase from the phase0 to the phase3 may represent an equalization process.

The loopback state 408 is a state for a testing, and the LTSSM may enter the loopback state 408 according to the value of the loopback bit in a symbol set arranged in a predetermined order which the devices connected to the PCIe interface sent and receive. In the loopback state 408, the receiver may retransmit the received packets all identically.

In the hot reset state 409, the LTSSM may perform a function of resetting the link. In the disabled state 410, when the receiver is in a low impedance state by the LTSSM, the transmitter may be switched to the electrical idle state.

In the link-up process constituting the link, the LTSSM may perform the functions described above while moving the eleven states 400, 401, 402, . . . 410 in a predetermined order. If the link-up is successful, the states actually executed by the LTSSM among the states 400, 401, 402, . . . 410 and their execution order until the link-up is successful may be stored in the internal memory of the PCIe controller as a reference order.

In an embodiment, the PCIe controller itself may execute the calibration operation of adjusting the PHY parameters of the physical layer. When the calibration operation is executed, the PCIe controller may execute the link-up process of configuring the link again according to the adjusted PHY parameters. If the link-up succeeds using the adjusted PHY parameters, the PCIe controller may compare the order of the states executed in the LTSSM until the link-up is completed with the reference order.

If the order of the states executed by the LTSSM does not match the reference order until the link-up is completed, the PCIe controller may change at least one of the PHY parameters again and execute the link-up process again. Until the order of the states executed by the LTSSM to complete the link-up matches the reference order, the PCIe controller may change at least one of the PHY parameters and repeatedly execute link-up. Therefore, the link may be configured with the PHY parameters optimized for the operating environment of the current time, etc., and the performance of the PCIe interface may be improved.

If the order of the states executed in LTSSM until the link-up is completed matches the reference order, the PCIe controller may verify the preset configured in Recovery-.Equalization of the recovery state 407. The PCIe controller may perform the verification based on at least one of the recovery policy, the reference value, and the preset history. If the validation fails, the PCIe controller may change at least one of the PHY parameters back and execute the link-up process again. The PCIe controller may terminate the link-up process if the verification is successful.

Figure 8:
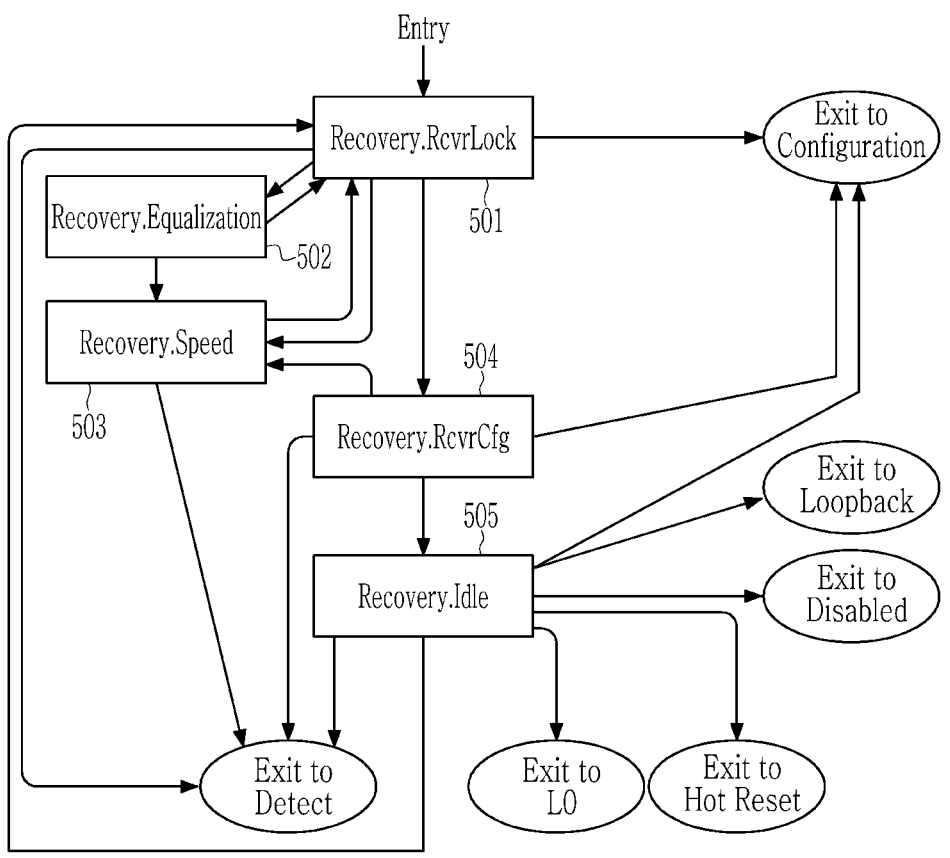
FIG. 8 illustrates a sub-state of a recovery state of a LTSSM according to an embodiment.

FIG. 8 illustrates a sub-state of a LTSSM's recovery state according to an embodiment.

Referring to FIG. 8, a LTSSM may enter a recovery state from a configuration state, a L0 state, a L0s state, a L1 state, and the like. In the recovery state, the LTSSM may perform a recovery operation while moving the sub-states 501-505 constituting the recovery state. When the recovery operation is completed, the LTSSM may enter the detect state, the L0 state, the loopback state, the hot reset state, or the disabled state according to the recovery result.

The LTSSM may enter the Recovery.RcvrLock 501 when entering the recovery state. In the Recovery.RcvrLock 501, the LTSSM may receive a training sequence and obtain a block alignment. The LTSSM may check a boundary of consecutive bits through the block alignment. Depending on the state (e.g., the L0 state, the L1 state, the L0s state, or the Recovery.Speed 503) before entering the Recovery.Rcvr-Lock 501, a block alignment time may be different.

The LTSSM may configure the preset while sequentially changing the phase from a phase0 to a phase3 in the Recovery.Equalization 502. The PCIe specification defines eleven presets, which include coefficients that affect the pre-shoot and the de-emphasis, used by the transmission equalizer. According to an embodiment, additional presets may be defined and used. The LTSSM may store the presets configured in the Recovery.Equalization 502. For example, the LTSSM configures the presets in the order of the first preset, the second preset, and the third preset during the recovery state, and the LTSSM may store the final configured preset (e.g., the third preset) and the preset history. The preset history may mean a preset change history in a preset search process of the LTSSM.

Figure 10:
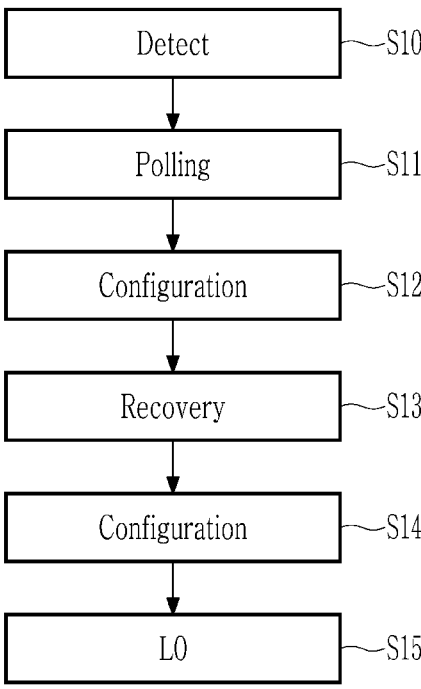
Figure 11:
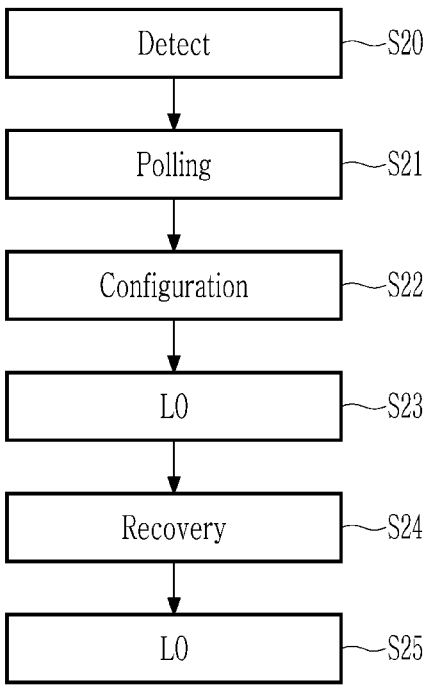

FIGS. 9, 10, and 11 illustrate an operation of a semiconductor device according to an embodiment.

FIG. 9 illustrates a reference order stored in a memory inside a semiconductor device according to an embodiment. As described above, the reference order may be the order in which the LTSSM that succeeded in the link-up executed the states, and be stored in a PCIe controller along with a memory inside a semiconductor device, for example, a LTSSM.

Referring to FIG. 9, the reference order stored in the memory may sequentially include a detect state S0, a polling state S1, a configuration state S2, a L0 state S3, a recovery state S4, and a L0 state S5. In other words, in an embodiment shown in FIG. 9, the LTSSM may succeed in the link-up by sequentially executing only the detect state S0, the polling state S1, the configuration state S2, the L0 state S3, the recovery state S4, and the L0 state S5 without entering the loopback state, the hot reset state, the disenabled state, the like.

As described above, the PCIe controller of the semiconductor device may start a calibration operation to adjust the PHY parameters of the PCIe interface when a specific condition is satisfied. For example, the PCIe controller may execute the calibration operation when a request for the calibration operation is received from the user, or the configured reference time elapses after being successful in the link-up with an external device. Also, the PCIe controller may perform the calibration operation whenever a power is supplied.

Referring to FIG. 10. as one of the conditions is achieved and the calibration operation is started, the PCIe controller may change at least one of the PHY parameters. Also, the PCIe controller may again execute the link-up process based on the changed PHY parameters. In an embodiment shown in FIG. 10, during the link-up process is performed, the LTSSM of the PCIe controller may sequentially execute the states. For example, the PCIe controller may sequentially execute the detect state S10, the polling state S11, the configuration state S12, the recovery state S13, the configuration state S14, and the L0 state S15.

For example, the LTSSM may fail in one of tasks such as assigning lane numbers and a skew removal between the lanes in the configuration state S12, which entered first. Accordingly, by entering the recovery state S13, the bit lock or symbol lock may be reconfigured or the link speed may be changed. Afterwards, the configuration of the lanes and the links may be completed in the configuration state S14 entered in second, and a transition to the L0 state 15 may be performed.

However, even if the link-up is successful through the steps shown in FIG. 10, the PCIe controller may again execute the link-up process by using the LTSSM. This, may be because the order in which the LTSSM executes the states in the embodiment shown in FIG. 10 is different from the reference order shown in FIG. 9. Therefore, the PCIe controller may adjust at least one of the PHY parameters and execute the link-up process again.

FIG. 11 illustrates a result of adjusting the PHY parameters and executing the link-up process again. As shown in FIG. 11, the PCIe controller may sequentially execute the detect state S20, the polling state S21, the configuration state S22, the L0 state S23, the recovery state S24, and the L0 state S25, and if the link-up process is successful, the PCIe controller may verify the final configured preset and the preset history in the recovery state S24. The verification operation of the PCIe controller is described later with reference to FIG. 12. If the verify operation fails, the PCIe controller may adjust at least one of the PHY parameters and execute the link-up process again. The PCIe controller may end the calibration operation if the verification operation succeeds.

FIG. 9 shows that the reference order stored in memory sequentially includes the detect state S0, the polling state S1, the configuration state S2, and the L0 state S3, but an embodiment is not necessarily limited thereto, and various embodiments combining the states of the LTSSM may be possible as the reference order stored in the memory.

Figure 12:
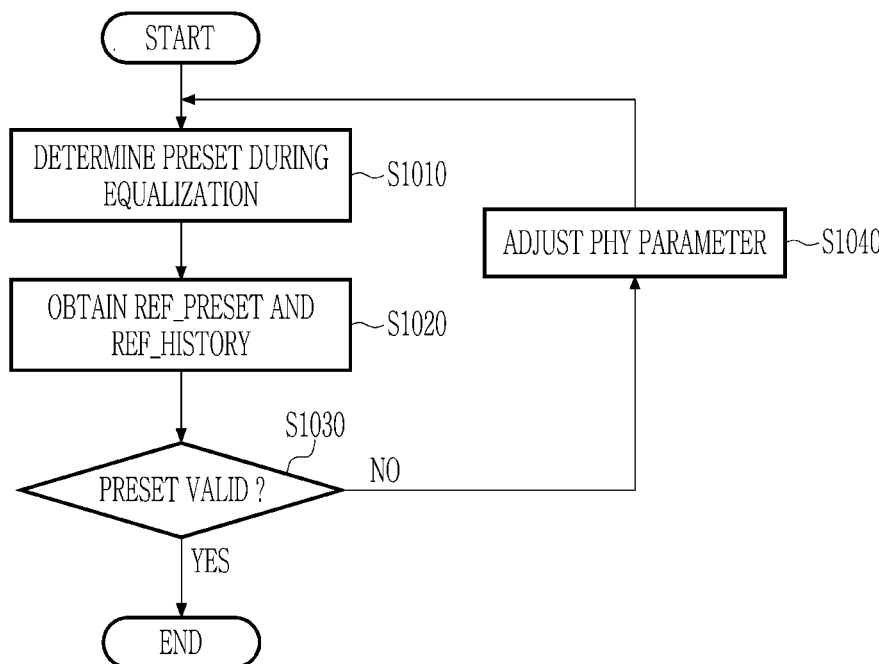
FIG. 12 illustrates an operation of a semiconductor device according to an embodiment.

FIG. 12 illustrates an operation of a semiconductor device according to an embodiment.

Referring to FIG. 12, a transmission-side semiconductor device may perform a link-up process while sending and receiving a training sequence with a receiving-side semiconductor device. The transmission-side semiconductor device may configure a preset of a transmission equalizer in a recovery state among a plurality of states used during the link-up process. The preset may include coefficients that affect at least one of the pre-shoot and the de-emphasis. That is, the operation for configuring the preset may be understood as an operation for configuring the coefficients. The coefficients may include the coefficient for the precursor, the coefficient for the current cursor, and the coefficient for the postcursor.

At operation S1010, the semiconductor device may determine the preset in an equalization operation among a plurality of sub-states constituting a recovery state. The semiconductor device may determine the final preset and the preset history. The semiconductor device may store the final preset and the preset history in the internal memory. For example, the semiconductor device may sequentially configure a first preset, a second preset, and a third preset among a plurality of presets in the equalization operation. Here, the semiconductor device may determine the third preset as the final preset and the preset configured order (i.e., the first preset→the second preset→the third preset) as the preset history.

At operation S1020, the semiconductor device may acquire a reference preset REF_PRESET and a reference history REF_HISTORY. The reference preset REF_PRESET and the reference history REF_HISTORY are the final preset and the preset history configured in the recovery state of the semiconductor device that successfully link-up, and may be stored in the internal memory.

At operation S1030, the semiconductor device may verify the preset based on at least one of the reference preset REF_PRESET and the reference history REF_HISTORY. In an embodiment, the semiconductor device may determine that the preset is valid if the final preset matches the reference preset REF_PRESET. In an embodiment, the semiconductor device may determine that the preset is valid if the preset history matches the reference history REF_HISTORY. In an embodiment, the semiconductor device may determine that the preset is valid if the final preset matches the reference preset REF_PRESET and the preset history matches the reference history REF_HISTORY. The semiconductor device may terminate the link-up process if the preset is valid.

At operation S1040, the semiconductor device may adjust the PHY parameter if the preset is invalid. The semiconductor device may adjust the PHY parameters and execute the link-up process again. The semiconductor device may determine the preset in the recovery state of the link-up process based on the adjusted PHY parameter.

Figure 13:
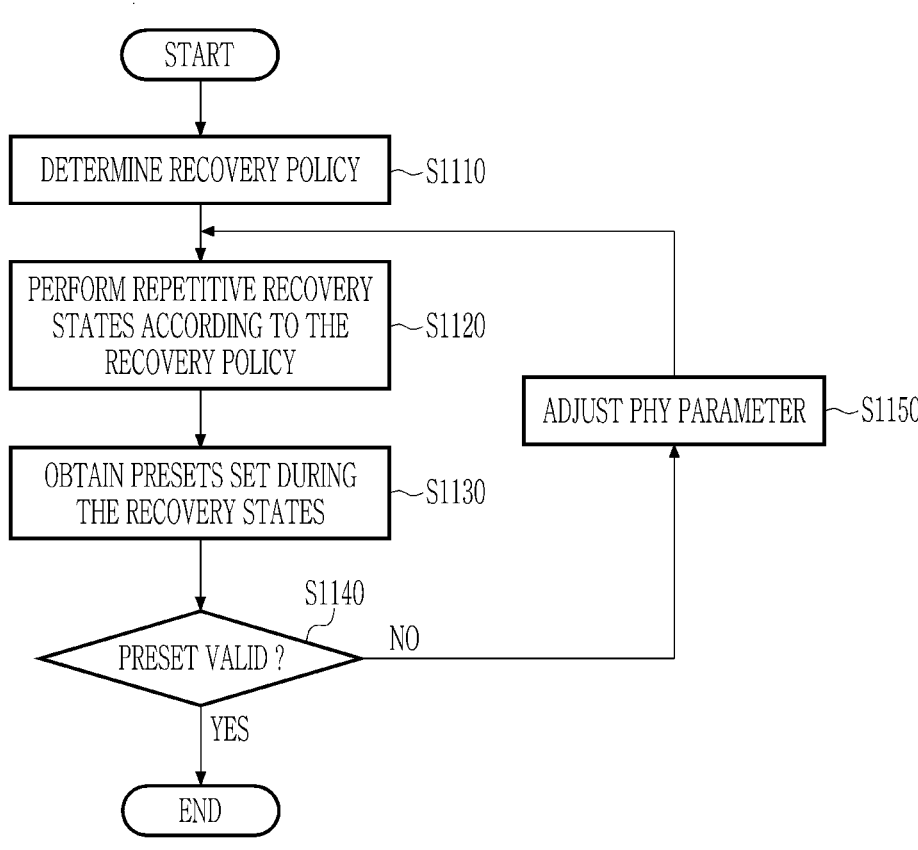
FIG. 13 illustrates an operation of a semiconductor device according to an embodiment.

FIG. 13 illustrates an operation of a semiconductor device according to an embodiment.

Referring to FIG. 13, a transmission-side semiconductor device may perform a link-up process while sending and receiving a training sequence with a receiving-side semiconductor device. The transmission-side semiconductor device may configure a preset of a transmission equalizer in a recovery state among a plurality of states used during the link-up process. The preset may include coefficients that affect at least one of a pre-shoot and a de-emphasis. The coefficients may include the coefficient for the precursor, the coefficient for the current cursor, and the coefficient for the postcursor.

At operation S1110, the semiconductor device may determine a recovery policy for verifying the configured preset in the recovery state (S1110). In an embodiment, the semiconductor device may select a strict recovery policy when performing the link-up process for the first time and select a relatively loose recovery policy when performing the link-up process again in the middle. The semiconductor device may perform the link-up process again due to an error or the like. In an embodiment, the semiconductor device such as a host may be connected to another plurality of semiconductor devices, and may determine different recovery policies for the plurality of semiconductor devices. For example, the strict recovery policy for an accelerator may be selected and the relatively loose recovery policy for a storage device may be selected. In an embodiment, the semiconductor device may determine the recovery policy in response to a request for the recovery policy from the user. The user may input the request for the recovery policy to the semiconductor device while using the semiconductor device.

The recovery policy may include at least one of a precision, an execution speed, a storage size, an error range, and a degree of a difference. That is, the semiconductor device may determine the recovery policy based on at least one of the precision, the execution speed, the storage size, the error range, and the degree of the difference. The precision indicates the precision of the preset configured in the recovery state, and the higher the precision may mean the stricter the recovery policy. The execution speed may represent the speed at which the preset verification is performed. The storage size indicates the size of storing the preset, and the larger the storage size, the more preset change histories may be stored. At this time, the execution speed may be related to the storage size. If the storage size is large, there are many presets to be verified, so the execution speed may be slow. The error range may indicate a ratio range of the preset that does not match the reference preset among the stored presets. The degree of the difference may indicate an acceptable degree even if the stored preset history does not match the reference history. For example, the preset history and the reference history may have differences in the number of the preset paths and the detailed preset paths. The degree of the difference may indicate an acceptable difference among the number of the paths or the detailed preset paths. For example, the reference history may be P1→P2→P5→P9. In the recovery state, when the configured preset history is P1→P2→P9, the number of the preset paths has the difference, and when the preset history is P1→P2→P4→P9, the detailed preset paths have the difference. An embodiment in which the semiconductor device determines the recovery policy is described with reference to FIGS. 14, 15, 16, and 17 later.

At operation S1120, the semiconductor device may perform multiple recovery states according to the recovery policy. For example, the semiconductor device may select a first recovery policy and perform a recovery state corresponding to the first storage size of the first recovery policy. The semiconductor device may select a second recovery policy that is looser than the first recovery policy and perform a recovery state corresponding to the second storage size of the second recovery policy. The second storage size may be smaller than the first storage size. That is, the semiconductor device may perform the recovery state as many times as the times corresponding to the storage size of the recovery policy.

At operation S1130, the semiconductor device may obtain a plurality of presets configured in several recovery states. For example, if the link-up is successful, the semiconductor device can store the preset configured in the recovery state in the internal memory. If the recovery state is performed several times, the plurality of presets may be stored in the internal memory.

At operation S1140, the semiconductor device may verify the preset based on the recovery policy. In an embodiment, the semiconductor device may determine that the preset is valid if the final preset matches the reference preset REF_PRESET based on the recovery policy. In an embodiment, the semiconductor device may determine that the preset is valid if the preset history matches the reference history REF_HISTORY based on the recovery policy. In an embodiment, the semiconductor device may determine that the preset is valid if the final preset matches the reference preset REF_PRESET and the preset history matches the reference history REF_HISTORY based on the recovery policy. The recovery policy may be different according to a timing, types of other devices connected to the semiconductor device, user requests, and the like. The semiconductor device may terminate the link-up process if the preset is valid.

At operation S1150, the semiconductor device may adjust the PHY parameter if the preset is invalid. The semiconductor device may adjust the PHY parameters and execute the link-up process again. The semiconductor device may perform several recovery states according to the recovery policy based on the adjusted PHY parameter.

FIGS. 14, 15, 16, and 17 are view provided to explain a recovery policy according to an embodiment. Based on any one of the embodiments shown in FIGS. 14, 15, 16, and 17, a semiconductor device may determine a recovery policy.

Referring to FIG. 14, a plurality of recovery policies may include first and second recovery policies POLICY1 and POLICY2. The first recovery policy POLICY1 may have a relatively low precision, and the second recovery policy POLICY2 may have a relatively high precision. The first and second recovery policies POLICY1 and POLICY2 may have the same storage size SIZE1 and each have an error range RANGE1 and RANGE2. Here, the error range RANGE1 may be larger than the error range RANGE2. The semiconductor device may store the presets corresponding to the storage size SIZE1 by selecting the first recovery policy POLICY1, and determine whether the stored presets are valid. For example, the semiconductor device may compare the final preset and the reference preset, and compare the preset history and the reference history. The semiconductor device may determine that the stored presets are valid if the error of the comparison result is within the error range RANGE1. Similarly, the semiconductor device may select the second recovery policy POLICY2 and determine whether the presets are valid based on the error range RANGE2. Since the error range RANGE1 is larger than the error range RANGE2, the precision of the first recovery policy POLICY1 may be lower than that of the second recovery policy POLICY2.

Referring to FIG. 15, a plurality of recovery policies may include first and second recovery policies POLICY1 and POLICY2. The first recovery policy POLICY1 may have a relatively low precision and a relatively fast execution speed. The second recovery policy POLICY2 has a relatively high precision and a relatively slow execution speed. The first and second recovery policies POLICY1 and POLICY2 each have storage sizes SIZE2 and SIZE3 and may have the same error range RANGE3. Here, the storage size SIZE2 may be smaller than the storage size SIZE3.

The semiconductor device may store the presets corresponding to the storage size SIZE2 by selecting the first recovery policy POLICY1 and determine whether the stored presets are valid. For example, the semiconductor device may compare a final preset and a reference preset, and compare a preset history and a reference history. The semiconductor device may determine that the stored presets are valid if the error of the comparison result is within the error range RANGE3. Similarly, the semiconductor device may select the second recovery policy POLICY2 and store the presets based on the storage size SIZE3. The semiconductor device may determine whether the presets are valid based on an error range RANGE3.

Since storage size SIZE2 is smaller than storage size SIZE3, even if the error range RANGE3 is the same, the execution speed of the first recovery policy POLICY1 may be faster than the execution speed of the second recovery policy POLICY2. Also, since the number of the presets to be verified in the first recovery policy POLICY1 is smaller than the number of the presets to be verified in the second recovery policy POLICY2, the precision of the first recovery policy POLICY1 may be lower than that of the second recovery policy POLICY2.

Referring to FIG. 16, a plurality of recovery policies may include first to third recovery policies POLICY1 to POLICY3. The first recovery policy POLICY1 may have a relatively low precision and a relatively fast execution speed. Third recovery policy POLICY3 may have a relatively high precision and a relatively low execution speed, and the second recovery policy POLICY2 may have a precision and an execution speed between the first recovery policy POLICY1 and the third recovery policy POLICY3. The first to third recovery policies POLICY1 to POLICY3 may have storage sizes SIZE1 to SIZE3 and error ranges RANGE1 to RANGE3, respectively. Here, a storage size SIZE4 may be smaller than a storage size SIZE5, and a storage size SIZE5 may be smaller than a storage size SIZE6. An error range RANGE4 may be larger than an error range RANGE5, and an error range RANGE5 may be larger than an error range RANGE6.

The semiconductor device may store presets corresponding to the storage size SIZE4 by selecting the first recovery policy POLICY1 and determine whether the stored presets are valid. For example, the semiconductor device may compare the final preset and the reference preset, and compare the preset history and the reference history. The semiconductor device may determine that the stored presets are valid if the error of the comparison result is within the error range RANGE4. Similarly, a similar description may be applied when the semiconductor device selects the second recovery policy POLICY2 or the third recovery policy POLICY3.

Since the storage size SIZE4 is smaller than the storage size SIZE5 and the error range RANGE4 is larger than the error range RANGE5, the execution speed of the first recovery policy POLICY1 may be faster than that of the second recovery policy POLICY2, and the precision of the first recovery policy POLICY1 may be lower than that of the second recovery policy POLICY2. Similarly, the execution speed of the second recovery policy POLICY2 may higher than that of the third recovery policy POLICY3, and the precision of the second recovery policy POLICY2 may be lower than that of the third recovery policy POLICY3.

Referring to FIG. 17, a plurality of recovery policies may include first to third recovery policies POLICY1 to POLICY3. The first recovery policy POLICY1 may have a relatively low precision and a relatively fast execution speed. The third recovery policy POLICY3 may have a relatively high precision and a relatively low execution speed, and the second recovery policy POLICY2 may have the precision and execution speed between the first recovery policy POLICY1 and the third recovery policy POLICY3. The first to third recovery policies POLICY1 to POLICY3 may each have a storage size SIZE7 to SIZE9, an error range RANGE7 to RANGE9, and a difference degree DIFF1 to DIFF3. Here, the storage size SIZE7 may be smaller than the storage size SIZE8, and the storage size SIZE8 may be smaller than the storage size SIZE9. The error range RANGE7 may be larger than the error range RANGE8, and the error range RANGE8 may be larger than the error range RANGE9. The difference degree DIFF1 may be greater than the difference degree DIFF2, and the difference degree DIFF2 may be greater than the difference degree DIFF3. For example, the difference degree DIFF1 may tolerate the difference between the preset history and the reference history. The difference degree DIFF2 may tolerate a difference in the number of the preset paths or a difference in the detailed preset paths among the differences between the preset history and the reference history. The difference degree DIFF3 may not tolerate any difference. That is, the difference degree DIFF1 may require the matching between the final preset and the reference preset, and the difference degree DIFF3 may require the matching between the final preset and the reference preset and the matching between the preset history and the reference history.

The semiconductor device may store presets corresponding to the storage size SIZE7 by selecting the first recovery policy POLICY1 and determine whether the stored presets are valid. For example, the semiconductor device may compare the final preset and the reference preset based on the difference degree DIFF1. The semiconductor device may determine that the stored presets are valid if the error of the comparison result is within the error range RANGE7.

The semiconductor device may store presets corresponding to the storage size SIZE8 by selecting the second recovery policy POLICY2 and determine whether the stored presets are valid. For example, the semiconductor device may compare the final preset and the reference preset based on the difference degree DIFF2 and compare the preset history and the reference history. The semiconductor device may determine that the stored presets are valid if the error of the comparison result is within the error range RANGE8. Similarly, the similar description may be applied even when the semiconductor device selects the third recovery policy POLICY3.

Since the storage size SIZE7 is smaller than storage size SIZE8, the error range RANGE7 is larger than the error range RANGE8, and the difference degree DIFF1 is larger than the difference degree DIFF2, the execution speed of first recovery policy POLICY1 may be faster than that of the second recovery policy POLICY2, and the precision of first recovery policy POLICY1 may be lower than that of the second recovery policy POLICY2. Similarly, the execution speed of second recovery policy POLICY2 may be higher than that of the third recovery policy POLICY3, and the precision of the second recovery policy POLICY2 may be lower than that of the third recovery policy POLICY3.

FIGS. 14, 15, 16, and 17 show that the plurality of recovery policies includes two or three recovery policies, but an embodiment is not necessarily limited thereto, and a plurality of recovery policies may be implemented as including four or more recovery policies having the different precisions, execution speeds, storage sizes, error ranges, or difference degrees.

Figure 18:
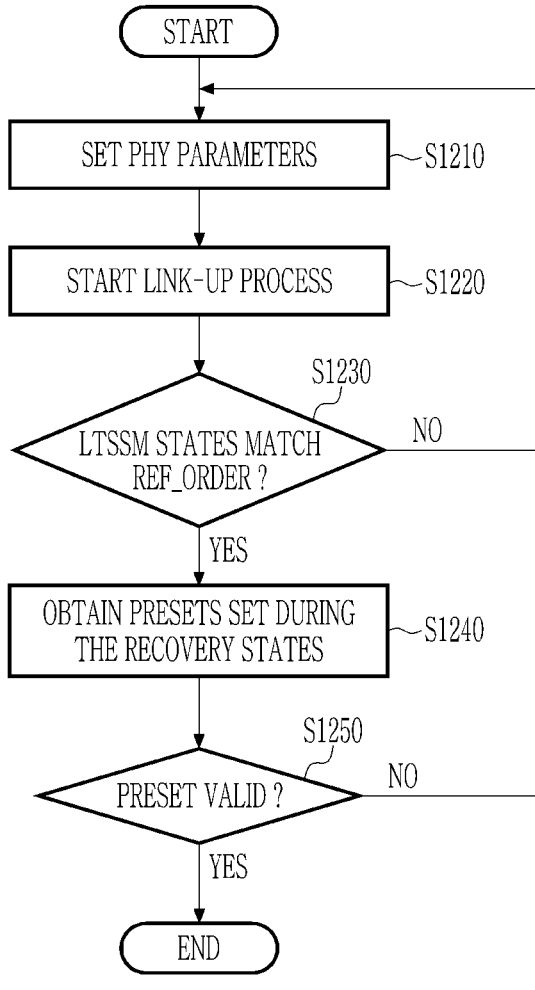
FIG. 18 illustrates an operation of a semiconductor device according to an embodiment.

FIG. 18 illustrates an operation of a semiconductor device according to an embodiment.

Referring to FIG. 18, a transmission-side semiconductor device may perform a link-up process while sending and receiving a training sequence with a receiving-side semiconductor device. The transmission-side semiconductor device may configure a transmission equalizer preset in the recovery state among the plurality of states used during the link-up process. The preset may include coefficients that affect at least one of a pre-shoot and a de-emphasis. That is, an operation for configuring the presets may be understood as an operation for configuring the coefficients. The coefficients may include the coefficient for the precursor, the coefficient for the current cursor, and the coefficient for the postcursor.

At operation S1210, the semiconductor device may configure PHY parameters. The PHY parameter may be a parameter configured in a physical layer of the semiconductor device to maintain an electrical stable state when a transmitter and a receiver are connected. For example, the semiconductor device may configure the PHY parameter with a predetermined value when a power is initially supplied or reset.

At operation S1220, the semiconductor device may initiate the link-up process based on the configured PHY parameter. For example, the LTSSM of the semiconductor device may execute the link-up process for configuring a plurality of lanes in a plurality of ports. The LTSSM may change states in the link-up process and store the changed states.

At operation S1230, the semiconductor device may determine whether the states stored by the LTSSM match the reference order REF_ORDER. The LTSSM that has succeeded in the link-up may store the order in which the states are executed in an internal memory (e.g., a register) as a reference order REF_ORDER. The semiconductor device may read the reference order REF_ORDER from the internal memory and compare the reference order REF_ORDER with the states stored in the current link-up process.

According to an embodiment, the reference order REF_ORDER may further include an execution order of sub-states constituting each state. Each of the detect state, the polling state, the configuration state, and the recovery state includes at least two sub-states, and the reference order REF_ORDER may include a reference order for sub-states. For example, the reference order REF_ORDER may include Recovery. RcvrLock→Recovery. Equalization→ Recovery.Speed→Recovery.RcvrLock→Recovery. RcvrCfg→Recovery.Idle→L0 states as the reference order in the recovery state. The semiconductor device may proceed into an operation (e.g., S1240) when the order of the states executed by the LTSSM and the order of the sub-states match the reference order REF_ORDER. The semiconductor device may reconfigure the PHY parameter if the states stored by the LTSSM do not match the reference order REF_ORDER.

At operation S1240, the semiconductor device may obtain the preset configured during the recovery state if the states stored by the LTSSM match the reference order REF_ORDER. The LTSSM may configure the preset in the transmission equalizer in the equalization operation of the recovery state among the states. The semiconductor device may obtain the final preset and the preset history configured by the LTSSM. For example, the LTSSM may configure the preset as P2→P4→P10→P5→P7 in the equalization operation, if the states stored by the LTSSM match the reference order REF_ORDER, the semiconductor device may acquire the final preset of P7 and the preset history P2→P4→P10→P5→P7.

At operation S1250, the semiconductor device may determine whether the preset is valid. The LTSSM that has succeeded in the link-up may store the preset value and the preset history configured in the recovery state in the internal memory as a reference value and a reference history, respectively. For example, the reference value may be P7, and the reference history may be P2→P4→P9→P5→P7. The semiconductor device may read the preset value and the reference history from the internal memory and compare the final preset and the preset history stored in the current link-up process with the preset value and the reference history.

In an embodiment, the semiconductor device may determine the validity of the preset according to the recovery policy. The recovery policy may include a policy for at least one of a precision, a history size, a permissible error range, a difference degree, and an execution speed. The semiconductor device may select the recovery policy in response to a user request, select a different recovery policy according to a type of another connected semiconductor device, or select a different recovery policy according to a timing. In an embodiment, the semiconductor device may select a strict recovery policy when performing the link-up process for the first time and select a relatively loose recovery policy when performing a link-up process again in the middle. The semiconductor device may perform the link-up process again due to an error or the like. In an embodiment, a semiconductor device such as a host may be connected to another plurality of semiconductor devices and may determine different recovery policies for the plurality of semiconductor devices. For example, a strict recovery policy may be selected for accelerators and a relatively loose recovery policy may be selected for storage devices.

The semiconductor device may determine that the preset is valid only when the comparison result completely matches based on the recovery policy, or the preset may be determined to be valid until the comparison result does not completely match but is similar based on the or recovery policy. That is, the semiconductor device may determine that the preset is invalid since the final preset P7 and the reference value P7 match, but the preset history P2→P4→P10→P5→P7 and the reference history P2→P4→P9→P5→P7 do not match based on the strict recovery policy. On the other hand, the semiconductor device may determine that the preset is valid since the final preset P7 and the reference value P7 coincide, and the preset history P2→P4→P10→P5→P7 and the reference history P2→P4→P9→P5→P7 may be tolerated in the difference degree based on a relatively loose recovery policy.

At operation 1210, if it is determined that the preset is invalid, the semiconductor device may configure again the PHY parameter. That is, the semiconductor device may configure the PHY parameter again and execute the link-up process again. The semiconductor device may terminate the link-up process when determining that the preset is valid.

Figure 19:
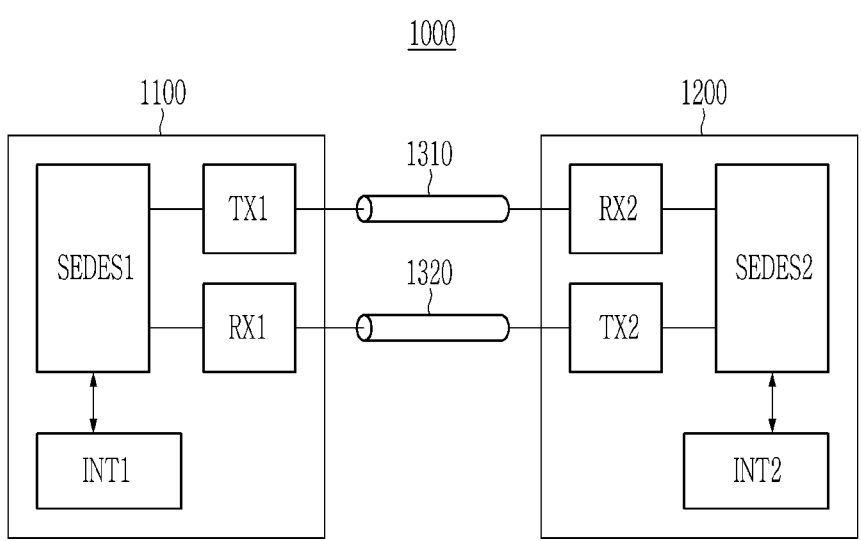
FIG. 19 illustrates a block diagram of an electron system according to an embodiment.

FIG. 19 illustrates a block diagram of an electron system according to an embodiment.

FIG. 19 represents a system that performs a bidirectional communication. Referring to FIG. 19, an electron system 1000 may include electronic devices 1100 and 1200. According to an embodiment, each of the electronic devices 1100 and 1200 may be implemented by one among various electronic devices such as a desktop computer, a laptop computer, a tablet computer, a smart phone, a wearable device, a video game console, a home appliance, a medical device, and the like.

However, the embodiments of the present disclosure are not limited thereto, and in another embodiment, the electron system 1000 may be implemented as a single electronic device. In these embodiments, each of the electronic devices 1100 and 1200 may be a constituent element or an IP (Intellectual Property) included in the single electronic device, and may be implemented as an entity such as a circuit, module, chip, and/or package level. The terms of a system and a device are provided to facilitate better understanding and are not limiting of embodiments of the present disclosure.

The electronic devices 1100 and 1200 may communicate with each other and exchange data/signals through communication channels 1310 and 1320. Each of the communication channels 1310 and 1320 may include a conductive material to transmit data/signals. For example, each of the communication channels 1310 and 1320 may be implemented as a trace pattern on a printed circuit board (PCB), a wire of a cable, a metal pin/pad of a connector, and the like. FIG. 19 shows two unidirectional communication channels 1310 and 1320, but according to embodiments, two unidirectional communication channels 1310 and 1320 may be combined into one bidirectional communication channel.

The electronic device 1100 may include an internal circuit INT1 that performs unique own function, a serializer/deserializer SEDES1, a transmission circuit TX1, and a reception circuit RX1. The electronic device 1200 may include an internal circuit INT2 performing unique own function, a serializer/deserializer SEDES2, a transmission circuit TX2, and a receiving circuit RX2.

The internal circuits INT1 and INT2 may operate to provide the unique functions of electronic devices (1100 and 1200) respectively. As an example, the internal circuits INT1 and INT2 may configure various configurations elements or IPs such as a processors (e.g., CPU (Central Processing Unit), AP (Application Processor), etc.), a memory, an image sensor, a display, etc.

The electronic devices 1100 and 1200 may be implemented as separate constituent elements, IPs, or devices. Accordingly, the electronic device 1100 may be an external device for the electronic device 1200, and the electronic device 1200 may be an external device for the electronic device 1100.

The serializer/deserializer SEDES1 may serialize data generated according to the operations of the internal circuit INT1 to be provided to the transmission circuit TX1. The transmission circuit TX1 may transmit the serialized signal to the electronic device 1200 through the communication channel 1310. The receiving circuit RX2 may equalize a signal received through the communication channel 1310 and restore a clock and data based on the equalized signal. The serializer/deserializer SEDES2 may in-parallelize the signal provided from the receiving circuit RX2 to provide an in-parallelized data.

Meanwhile, the serializer/deserializer SEDES2 may serialize data generated according to the operations of the internal circuit INT2 to provide the serialized data to the transmission circuit TX2. The transmission circuit TX2 may transmit the serialized signal to the electronic device 1100 through the communication channel 1320. The receiving circuit RX1 may equalize a signal received through the communication channel 1320 and restore a clock and data based on the equalized signal. The serializer/deserializer SEDES1 may in-parallelize a signal provided from the receiving circuit RX1 to provide the in-parallelized data.

In this way, the electronic devices 1100 and 1200 may exchange the data/signals with each other via the communication channels 1310 and 1320. When the speed of the communication between the electronic devices 1100 and 1200 increases (e.g., the communication is performed at a higher frequency or bandwidth), the electronic devices 1100 and 1200 may exchange more data per a unit time.

However, due to various factors such as a skin effect and a dielectric loss, each of the communication channels 1310 and 1320 may show a low-pass frequency response characteristic. Thus, in high speed operation, the bandwidths of the communication channels 1310 and 1320 may be limited and may be smaller than the bandwidth of the signals. This may attenuate high-frequency components of the signals transmitted through the communication channels 1310 and 1320 and cause an inter-symbol interference (ISI) on a time domain. Resultantly, the faster the speed to transmit the signals, the more distorted of the signals and the deterioration of the quality of the signals.

To compensate for the unintended distortion of the signals, the equalizer included in the transmission circuits TX1 and TX2 may perform a pre-equalization such as a pre-shoot and/or a de-emphasis, and the equalizer included in the receiving circuits RX1 and RX2 may perform an equalization of a frequency region and/or a time region on the received signals. The equalizer included in the transmission circuits TX1 and TX2 may be referred to as a transmission equalizer, and the equalizer included in the reception circuits RX1 and RX2 may be referred to as a receive equalizer.

According to one or more embodiments of the present disclosure, at least one of the transmission circuits TX1 and TX2 may configure the preset in the transmission equalizer to improve the quality of the signals to be transmitted, and verify the validity of the configured preset. At least one of the transmission circuits TX1 and TX2 may perform the link-up process while changing the PHY parameters until the validation is successful if the preset is invalid.

In one or more embodiments, each constituent element or the combination of two or more constituent elements described with reference to FIGS. 1-19 may be implemented as a digital circuit, a programmable or non-programmable logic device or array, an application specific integrated circuit (ASIC), or the like.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A semiconductor device comprising:
a plurality of ports configured to send and receive data on a peripheral component interconnect express (PCIe) interface; and
a PCIe controller operatively connected to the plurality of ports, the PCIe controller comprising:
a link training and status state machine (LTSSM) configured to perform a link-up by configuring a plurality of lanes on the plurality of ports, and
a memory configured to store a first preset as a reference value and a first order of states as a first reference order, the first preset being configured based on a successful link-up performed by the LTSSM, and the first order of states corresponding to an order in which the LTSSM operates to execute the successful link-up,
wherein the PCIe controller is configured to determine whether a second preset configured by the LTSSM is valid, by performing a verification of the second preset based on a comparison of the second preset with the reference value during a link-up process, and based on a comparison of a second order of states with the first reference order, and
wherein the second order of states corresponds to an order in which the LTSSM operates to execute the link-up process in which the second preset is configured.

2. The semiconductor device of claim 1, wherein the PCIe controller is further configured to:
configure a physical layer (PHY) parameter for data communication of a physical layer before the LTSSM performs the link-up process; and change the PHY parameter based on determining that the second preset is invalid.

3. The semiconductor device of claim 1, wherein the PCIe controller is further configured to:
determine that the second preset is valid based on the second preset matching the reference value and the second order of states matching the first reference order.

4. The semiconductor device of claim 1, wherein the memory further stores a change history of the first preset as a reference history, the change history of the first preset being configured based on the successful link-up performed by the LTSSM, and
the PCIe controller is further configured to perform the verification of the second preset based on the reference value and the reference history.

5. The semiconductor device of claim 4, wherein the PCIe controller is further configured to:
determine that the second preset is valid, based on the second preset matching the reference value, the second order of states matching the first reference order, and a change history of the second preset matching the reference history.

6. The semiconductor device of claim 4, wherein the PCIe controller is further configured to:
determine that the second preset is valid, based on the second preset matching the reference value, the second order of states matching the first reference order, and a difference between a change history of the second preset and the reference history being less than a predetermined difference degree.

7. The semiconductor device of claim 1, wherein the PCIe controller is further configured to:
perform the verification of the second preset based on a recovery policy corresponding to a precision of the verification of the second preset.

8. The semiconductor device of claim 7, wherein the PCIe controller is further configured to:
select a first recovery policy based on an environment requiring a relatively high precision, and select a second recovery policy based on an environment requiring a relatively low precision, and
wherein a storage size of the first recovery policy is greater than a storage size of the second recovery policy.

9. The semiconductor device of claim 7, wherein the recovery policy corresponds to at least one of the precision of the verification of the second preset, an execution speed, a storage size, an error range, and a difference degree.

10. The semiconductor device of claim 1, wherein the memory further stores an order of sub-states as a second reference order, the order of sub-states being configured based on the successful link-up performed by the LTSSM, and
the PCIe controller is further configured to determine that the second preset is valid, based on the second order of states matching the first reference order and a third order of sub-states matching the second reference order, the second order of states and the third order of sub-states each corresponding to the second preset.

11. A semiconductor device comprising:
a plurality of ports configured to send and receive data on a peripheral component interconnect express (PCIe) interface; and
a PCIe controller operatively connected to the plurality of ports, wherein the PCIe controller is configured to:

perform a link-up process to configure a plurality of lanes in on the plurality of ports, perform a first verification of a first preset that is configured at a first time during the link-up process, and perform a second verification of a second preset that is configured at a second time during the link-up process, after the first time, wherein the first verification includes a first comparison of the first preset and a reference preset, and includes a second comparison of a first order of states in which the LTSSM operates in the link-up process before the first time and a reference order of states in which the LTSSM operates to execute a successful link-up, wherein the second verification includes a third comparison of the first preset and the reference preset, and includes a fourth comparison of a third order of states in which the LTSSM operates in the link-up process between the first and second times and the reference order of states, and wherein the PCIe controller is configured to perform the first and second comparisons based on a first recovery policy, and perform the third and fourth comparisons based on a second recovery policy.

12. The semiconductor device of claim 11, wherein the PCIe controller is further configured to:

determine at least one of the first recovery policy or the second recovery policy based on at least one of a precision, an execution speed, a storage size, an error range, and a difference degree.

13. The semiconductor device of claim 12, wherein the PCIe controller is further configured to:

determine the first recovery policy having a first storage size at the first time; and determine the second recovery policy having a second storage size smaller than the first storage size at the second time.

14. The semiconductor device of claim 12, wherein the PCIe controller is further configured to:

determine the first recovery policy with a first error range at the first time; and determine the second recovery policy having a second error range smaller than the first error range at the second time.

15. The semiconductor device of claim 12, wherein the PCIe controller is further configured to:

determine the first recovery policy with a first difference degree at the first time; and determine the second recovery policy having a second difference degree greater than the first difference degree at the second time.

16. A method of configuring a link, the method comprising:

obtaining a preset history including a plurality of presets, the plurality of presets being sequentially configured in a recovery operation of a link training and status state machine (LTSSM);

determining whether a final preset among the plurality of presets is valid, based on a first comparison of an order of states in which the LTSSM operates in the recovery operation and a reference order of states in which the LTSSM operates to execute a successful link-up, and based on a second comparison of the preset history and a reference history corresponding to the successful link-up; and adjusting a physical layer (PHY) parameter based on determining that the final preset is invalid.

* * * * *